United States Patent [19]

Ross

[11] Patent Number: 5,052,880
[45] Date of Patent: Oct. 1, 1991

[54] VEHICLE HOISTING TOW TRAILER

[76] Inventor: Kevin R. Ross, 74231 Burk, Armada, Mich. 48005

[21] Appl. No.: 561,013

[22] Filed: Jul. 31, 1990

[51] Int. Cl.$^5$ .............................................. B60P 3/12
[52] U.S. Cl. .................................. 414/563; 280/402; 254/2 R
[58] Field of Search .............. 414/563, 680, 428, 569, 414/546, 23; 280/402; 254/2 R, 2 B, 8 R, 127, 8 B

[56] References Cited

U.S. PATENT DOCUMENTS

| | | | |
|---|---|---|---|
| 2,541,582 | 2/1951 | Hawkins | 414/563 X |
| 2,701,069 | 2/1955 | Hawkins | 414/563 |
| 3,522,892 | 8/1970 | Vegors | 414/563 |
| 3,784,036 | 1/1974 | Gjoerloff | 414/563 |
| 3,841,506 | 10/1974 | Smith | 414/563 |
| 3,843,093 | 10/1974 | Thompson et al. | 414/563 X |
| 4,087,008 | 5/1978 | Silva, Jr. | 414/563 |

FOREIGN PATENT DOCUMENTS 8401752  5/1984  PCT Int'l Appl. ................. 280/402

Primary Examiner—Frank E. Werner
Attorney, Agent, or Firm—John R. Benefiel

[57] ABSTRACT

A two wheeled towing trailer having a tongue for connecting to a towing vehicle, with an upright support post mounted to the center of an axle tube on which the wheels are rotatably supported. The support post has a cross arm pivotally attached to the upper end of the axle tube allowing the support post and cross arm to be lowered by swing down on the axle tube, allowing attachment of a vehicle to the cross arm by a pair of chains. A lever arm and winch are operated to raise the cross arm and hoist the vehicle to be supported on the support post. The lever arm is locked in the lowered position for towing. The cross arm pivots to improve maneuverability.

7 Claims, 2 Drawing Sheets

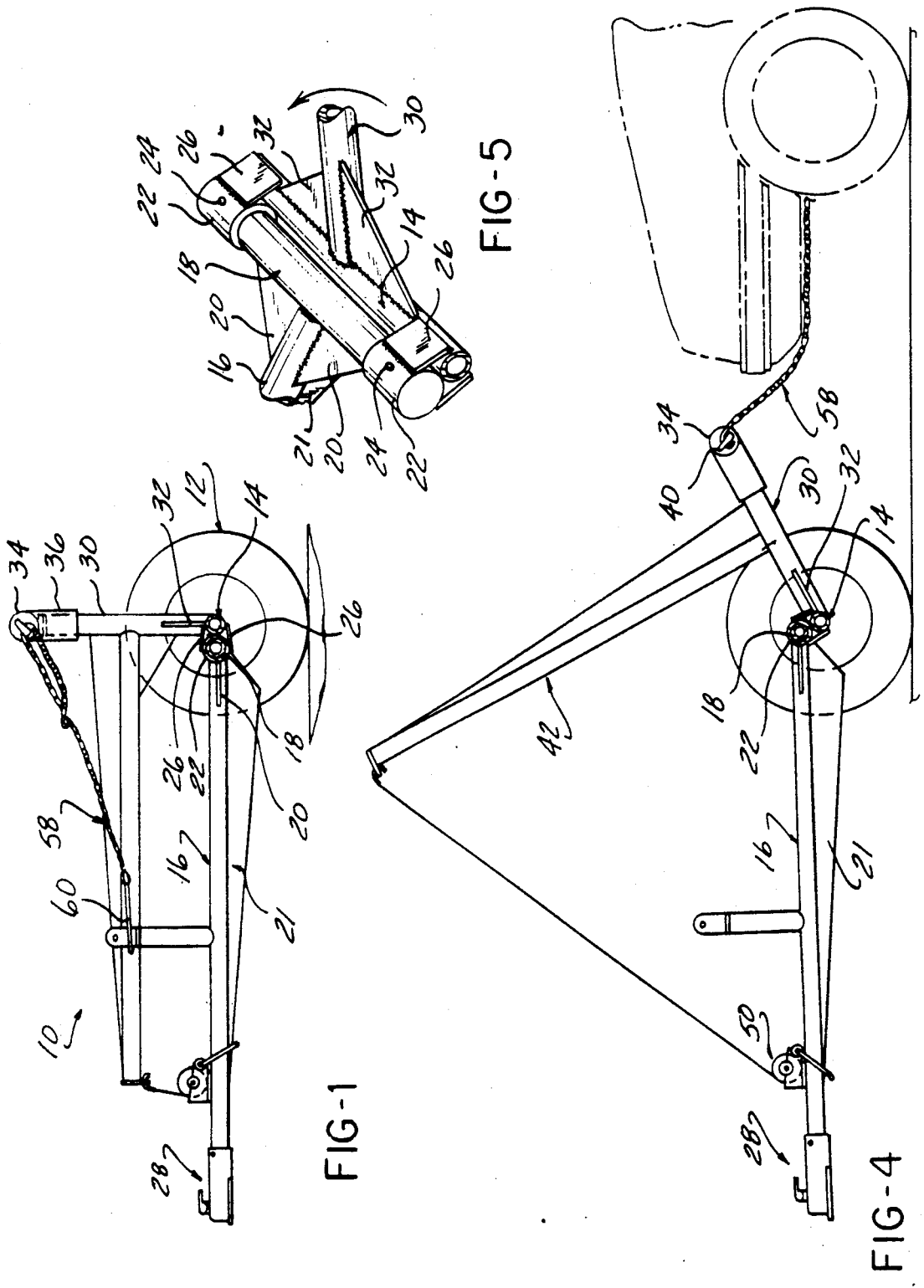

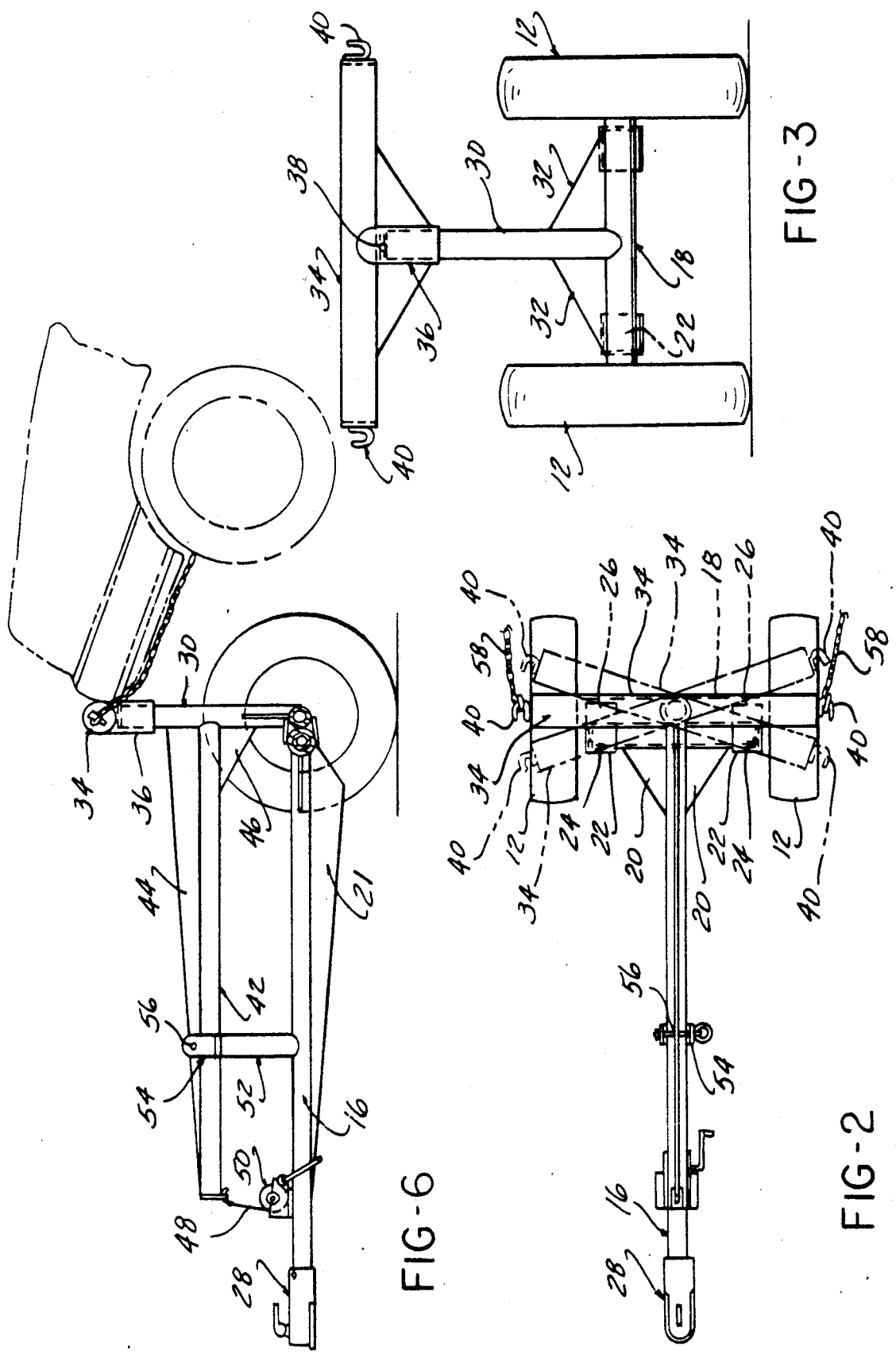

VEHICLE HOISTING TOW TRAILER

This invention concerns equipment for towing vehicles such as cars and light trucks.

Disabled or other vehicles to be towed by another vehicle must now be hoisted to raise the front or rear wheels off the ground, and supported in the raised position during towing.

Various types of equipment have been devised for this purpose, some designed to be installed on the bed of pick up trucks. It would be advantageous to enable such towing by any vehicle including ordinary cars or vans, and for this reason hoisting trailers or dollies have been designed, attached by a suitable hitch to the towing vehicle.

Examples of these prior designs are shown in U.S. Pat. Nos. 3,721,356; 2,937,772; 4,087,008; 2,701,069; 4,323,328; 3,841,506; and 4,759,683.

These prior designs are complex in construction and use, some requiring hydraulic cylinders to operate, others using heavily loaded cables operated by a heavy duty winch.

Also, articulation between the towed vehicle and the trailer would assist in negotiating turns, and these prior design do not provide this capability. In the case of the design shown in U.S. Pat. No. 2,701,069, a complex steering system for the trailer wheels is incorporated.

The prior designs are also relatively bulky, and most are too wide to be received in the cargo space of a standard pick up.

SUMMARY OF THE INVENTION

The present invention comprises a two wheeled towing trailer having a tongue or draft bar adapted to be hitched to the towing vehicle.

A relatively long swingable lever bar extends longitudinally for a central upright support post attached to an axle sleeve on each end of which the trailer wheels are rotatably mounted relatively closely spaced apart. The support post in turn has a horizontal vehicle carrying cross arm pivotally mounted at the upper end thereof, a chain hook attached to each end of the cross arm.

The lever bar may be rotated up to lower the support post and cross arm to enable hook up of a vehicle with the use of chains, the lever bar thereafter being pivoted down to raise the vehicle by a winch mounted at the forward end of the tongue, the lever bar thereafter locked in the down position.

The tongue has attached a transverse mounting sleeve mounted to extend adjacent and parallel to the axle tube by having each end received in a respective bearing cup fixedly secured alongside either end of the axle tube, which allows turning of the ends of the mounting sleeve as the support post is rotated to the rear by rotation of the axle tube as the lever bar is raised.

The trailer is very simply configured and compact, and is operated by a light weight winch and cable due to the great leverage afforded by the lever bar.

The cross arm may pivot on the support arm with the trailer and towed vehicle underway, facilitating the negotiation of turns by articulation between the trailer and the towed vehicle. This enables U-turns to be easily performed.

The mounting of the support post on the axle tube insures that no portion of the weight of the towed vehicle is transmitted through the tongue and hitch to the towing vehicle.

DESCRIPTION OF THE DRAWINGS

FIG. 1 is a side elevational view of a towing trailer according to the present invention with stowed chains and hooks.

FIG. 2 is a plan view of the towing trailer shown in FIG. 1 with a phantom line representation of the pivoting of the mounting bar.

FIG. 3 is an enlarged end view of the trailer shown in FIGS. 1 and 2.

FIG. 4 is a side elevational view of the trailer shown in FIGS. 1-3 with the lever bar raised, with a fragmentary view of the front of a vehicle to be secured thereto.

FIG. 5 is an enlarged fragmentary view of the axle sleeve, mounting sleeve and bearing cups incorporated in the trailer shown in FIGS. 1-4.

FIG. 6 is a side elevational view of the trailer shown in FIG. 4 with the towed vehicle attached and hoisted.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIGS. 1-3, the towing trailer 10 according to the present invention includes a pair of wheels 12, preferably automotive type including pneumatic tires, rotatably mounted with standard wheel bearings (not shown) on either end of an axle tube 14.

A tubular steel tongue 16 is mounted to the axle tube 14 by means of a mounting sleeve 18 fixed to the rear end of the tongue 16, as by welding. Reinforcing gussets 20 may be fixed at the joints with a lengthwise extending stiffening web 21 welded to the bottom of the tongue 14.

The mounting sleeve 18 is comprised of a length of steel tube and extends transversely, parallel to the axle tube 18, and has either end received in a respective bearing cup 22 so as to accommodate pivoting motion therein. The mounting sleeve 18 has closed ends so as to define a grease cavity, with grease fittings 24 enabling injection of grease.

The bearing cups 22 are fixed to the axle tube 14 by a series of connector plates 26 welded to the exterior of the axle tube 14 and bearing cups 22 along the top and bottom.

The tongue 16 is provided with a standard hitch 28 at its forward end for attachment to a ball on towing vehicle (not shown).

An upright support post 30 (comprised of a steel tube) is attached, as by welding at a central location, gussets 32 also attached as reinforcements.

The support post 30 has a horizontal, vehicle carrying cross arm 34 pivotally mounted at the upper end of the support post 30 by means of a bearing cap 36 slidably received over the closed upper end of the support post 30. A grease fitting 38 allows the introduction of grease into the interior space.

A chain hook 40 is attached to either end of the cross arm 34.

A tubular steel lever arm 42 of relatively long length is attached as by welding to the support post 30 at an intermediate height thereon, extending forwardly for a major proportion of the length of the tongue 14 vertical gussets 44 and 46 may be installed to stiffen the lever bar 42 and reinforce the connections to the support post 30.

The forward end of the lever bar 42 has a cable 48 attached extending to a light weight hand winch 50 mounted below on the upper side of the tongue 14.

A stanchion 52 having a clevis 54 at the upper end receives the lever bar 42 and enables securing locking with a locking pin 56 inserted in aligned holes in the clevis 54.

The winch 50 is operated after removal of the locking pin 56 to allow the lever bar 42 to be elevated as shown in FIG. 4, lowering the support post 30 and cross arm 34 by pivoting of the axle tube 14. Pivoting of the axle tube 14 causes swinging of the mounting sleeve 18 and slight upward tilting of the tongue 16 to accommodate this lowering motion.

Chains 58 may be secured to the hooks 40 and with hooks 60 attached to the underframe of a vehicle to be towed.

The winch 50 is then operated to hoist the vehicle and restore the support post to its vertical position as shown in FIG. 6. The pin 56 reinserted to lock the lever bar 42 in its lowered position.

The cross arm 34 can pivot to improve the maneuverability of the trailer and towed vehicle as indicated in FIG. 2.

The great leverage afforded by the lever bar 42 allows a light weight winch 50 and cable 48 to be employed, and enables the hoisting operation to be easily performed.

The wheels 12 are relatively closely spaced to be received between the towed vehicle's wheels, and this results in a very compact trailer.

It will be appreciated that the trailer is very simple and compact, so that the above described advantages are achieved.

I claim:

1. A towing trailer comprising:
   an elongated tongue having a hitch at one end;
   a pair of side by side wheels;
   axle means having each of said wheels rotatably mounted at a respective end thereof;
   mounting means mounting said axle means to the other end of said tongue, said axle means extending transversely to said tongue;
   an upright support post attached to said axle means at a central location thereon;
   a mounting member and means mounting said member to the upper end of said support post;
   means for securing a towed vehicle to the mounting member;
   a lever bar attached at one end to said support post at a point intermediate the height thereof and extending forwardly above said tongue, said lever bar able to be raised to lower said support post by pivoting said axle means and causing said cross arm to be lowered to enable a vehicle to be secured thereto;
   winch means for drawing down the other end of the lever arm to raise the support post and so hoist the vehicle thereby;
   locking means for locking the lever bar in the lowered position thereof.

2. The towing trailer according to claim 1 wherein said mounting member comprises a horizontal cross arm, pivotally mounted to the upper end of said support post.

3. The towing trailer according to claim 2 wherein said means mounting said cross arm to the upper end of said support post comprises a bearing cup slidably received over the upper end of said support post, said bearing cup fixed to the center of said cross arm.

4. The towing trailer according to claim 2 wherein a chain hook is attached to either end of said cross arm and comprising said means for securing a vehicle thereto.

5. The towing trailer according to claim 2 wherein said tongue, and lever bar, support post and cross arm are each constructed of tubular steel.

6. The towing trailer according to claim 1 wherein said axle means comprises an axle tube and said means mounting said tongue to said axle means comprises a transverse mounting sleeve attached to said one end of said tongue, a pair of bearing cups attached to said axle tube at either end thereof, each bearing cup slidably receiving a respective end of said mounting sleeve, whereby said mounting means accommodates pivoting of said axle tube by raising of said lever bar.

7. The towing trailer according to claim 1 wherein said lever arm extends for a major proportion of the length of said tongue when in said lowered position.

* * * * *